H. M. HOBART.
METHOD OF AND MEANS FOR CONTROLLING INDUCTION MOTORS.
APPLICATION FILED MAR. 21, 1916.

1,315,771. Patented Sept. 9, 1919.

Inventor:
Henry M. Hobart,
by Albert G. Davis
His Attorney

UNITED STATES PATENT OFFICE.

HENRY M. HOBART, OF SCHENECTADY, NEW YORK, ASSIGNOR TO GENERAL ELECTRIC COMPANY, A CORPORATION OF NEW YORK.

METHOD OF AND MEANS FOR CONTROLLING INDUCTION-MOTORS.

1,315,771. Specification of Letters Patent. Patented Sept. 9, 1919.

Application filed March 21, 1916. Serial No. 85,717.

*To all whom it may concern:*

Be it known that I, HENRY M. HOBART, a citizen of the United States, residing at Schenectady, in the county of Schenectady, State of New York, have invented certain new and useful Improvements in Methods of and Means for Controlling Induction-Motors, of which the following is a specification.

My invention relates to a method of controlling an induction motor and to an arrangement of apparatus utilized in carrying out this method.

In the patent to Bradley #514,903 of February 20, 1894, there is shown and described a special form of induction motor provided with two primary windings associated with a two-part secondary winding in which the parts are electrically and mechanically interconnected, and a high resistance placed in shunt to the electrical interconnections. The patent describes how the secondary currents may be forced to flow through the high resistance, or made to avoid the same, by shifting the relative positions of the primary windings with respect to the secondary winding, or by shifting the terminal points of the primary winding along its coils. Such an arrangement possesses many disadvantages, which increase as the size of the motor is increased.

Now, I have found that such a motor can be simply and efficiently operated if two alternating current generators are devoted to the supply of current to the motor and means are provided for varying the value and direction of the excitation of one of said generators. Such an arrangement will be particularly adapted for use in the propulsion of gas-electric cars or the electric propulsion of ships, where it is customary to provide one or more generators devoted entirely to the supply of current to the driving motor.

Accordingly, my invention comprises a novel arrangement of apparatus and a method of operation, including starting and accelerating a motor of the type indicated, whereby the disadvantages previously encountered may be avoided.

Figure 1:
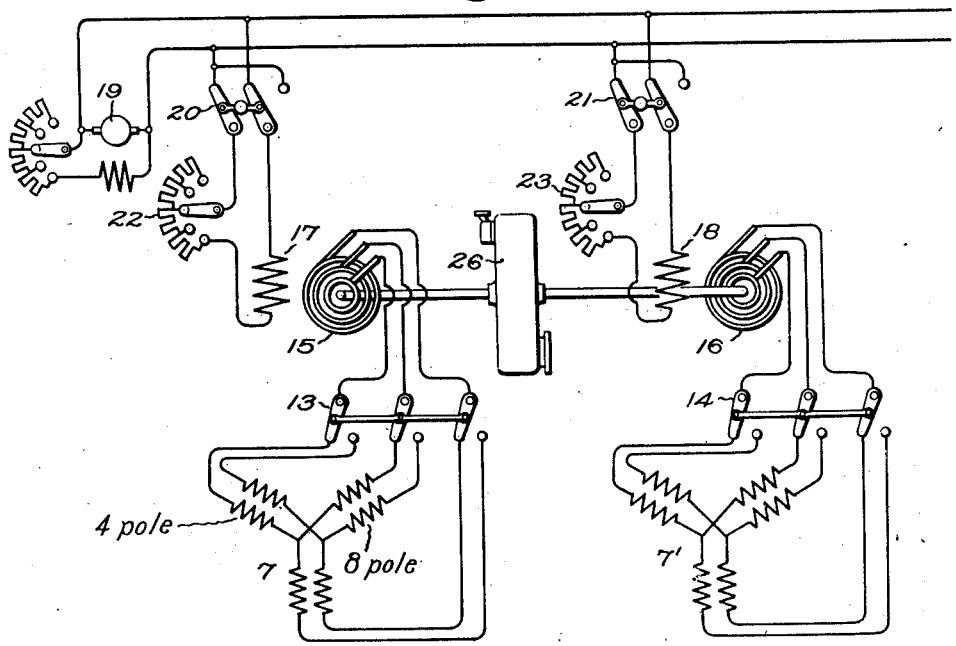
Figure 3:
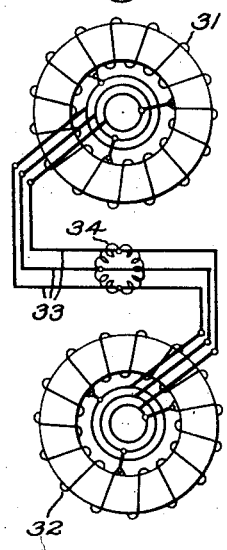
Figure 3:
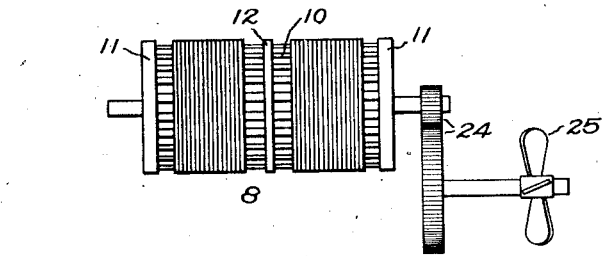
Figure 2:
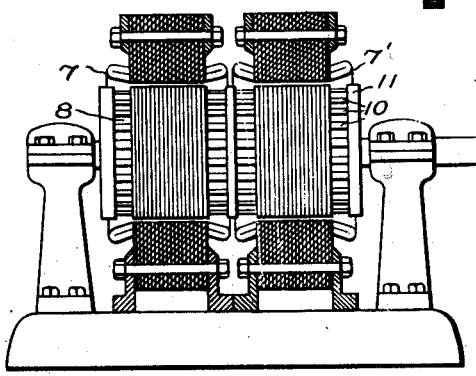

In the accompanying drawing, I have illustrated the novel arrangement of apparatus which I propose to employ, together with certain modifications thereof, and I shall later describe my novel method of operation in connection with this drawing. In the drawing, Figure 1 is a diagrammatic view of my preferred arrangement; Fig. 2 is a longitudinal cross-section of one form of induction motor which may be employed; Fig. 3 is a modified arrangement of the secondary winding of such a motor.

Referring first to Fig. 2, a motor of this type will ordinarily be constructed with the primary windings 7 and 7' mounted on the stators of the motor which are preferably arranged side by side on a common support. I have here shown the secondary winding mounted upon the rotor 8, and comprising a squirrel-cage winding in which longitudinal bars 10 are interconnected at either end by means of low resistance end rings 11, and in which the electrical interconnections between the two parts of the secondary winding are shunted, at a point intermediate the planes of the stators, by means of a high resistance ring 12. These primary windings 7 may conveniently be formed in any well-known manner so as to provide the equivalent of two primary windings having different pole numbers, such, for example, as four poles and eight poles, as I have indicated by the legends applied to the windings in Fig. 1, it being understood that a single winding arranged to give two pole numbers may be used instead of the two independent windings shown. The switches 13 and 14 will then be so arranged that either one of these windings may be connected to its source of supply, as, for example, the generators 15 and 16. These generators must be operated in synchronism and will preferably be driven by a common prime mover 26. Each of the generators is provided with a field winding 17 and 18, respectively, which may be excited from any convenient source, such as the exciter 19. I then provide reversing switches 20 and 21 in circuit with these field windings, whereby the current supplied to the same may be reversed; and I have also provided the usual field rheostats 22 and 23, to control the degree of excitation.

Such an arrangement as I have herein illustrated will be especially adapted for use upon gas-electric cars, or for electric ship propulsion, wherein one or more generators are usually provided which are devoted chiefly or exclusively to supplying current to the motor driving the vehicle. For this reason I have shown, in Fig. 1, the secondary squirrel-cage winding 8 connected to a propeller 25 by means of gears 24. A motor of this type may be effectively started by causing the rotating fields of the primary windings to occupy different inductive positions in relation to the corresponding parts of the secondary winding, so that the currents induced in the secondary winding oppose each other, and are compelled to flow through the high resistance interconnecting the conductors of the same. The result is, that the resistance of the secondary winding is very considerable, and the motor is started with a strong torque.

In the arrangement shown in the Bradley patent, one of the stators carrying a primary winding would be angularly displaced with reference to the other in order to cause the rotary fields to occupy different inductive positions in relation to the parts of the secondary winding, or else the terminal points of the primary winding would be gradually shifted along its coils. With motors of any considerable size, however, such an arrangement presents great mechanical difficulties, and I have, therefore, sought to provide an arrangement whereby the shifting of the relative positions of the rotary fields may be effected electrically without disturbing the mechanical position of the primary winding or its terminals. To this end I connect one of the primary windings to its generator in such a manner that the poles induced in the bars of one part of the secondary winding will be of opposite polarity to those induced by the corresponding bars of the other part of the secondary winding. This will set up opposing currents, which are compelled to flow through the intermediate high resistance connecting member. The motor will then start with a strong torque, and its speed will gradually increase up to some fixed value. When this speed has been reached, the phase of the excitation applied to one of the primary windings may be reversed by reversing the field current of the corresponding generator, as, for example, by throwing the reversing switch 21. This will result in inducing poles of like polarity in corresponding bars of the two parts of the secondary winding, so that the secondary currents may flow through the low resistance end rings 11 and allow the motor speed to gradually increase still further.

If it is desired to avoid the abrupt changes in conditions (claimed in my application, Serial No. 85,718 filed of even date herewith) which would be obtained by simply throwing the reversing switch 21, a more gradual transition may be effected by gradually weakening the excitation of the field of the generator 16 to an appropriate value, whereupon the switch 21 may be thrown and the excitation of the field winding 18 again increased by proper manipulation of the rheostat 23.

If the above described operation has been carried out with those primary connections which produce the larger number of poles, then still further speed variation may be obtained by throwing the switches 13 and 14 so as to cause the primary windings to produce the smaller number of poles. When this is being done, the field of one of the generators is preferably reversed, as, for example, by throwing the switch 21 so that the secondary currents are again caused to traverse the high resistance member 12. The operation above described may then be repeated by gradually weakening the excitation of the field winding 18, reversing the same, and again increasing its excitation. The speed of the motor, meanwhile, gradually increases beyond what it was when the primary windings produced the larger number of poles, up to a value which represents the ratio between the two sets of pole members. Thus, if eight poles produce a certain number of revolutions per minute, then four poles will practically double this speed. As will be readily understood, a reversal of the direction of rotation may be accomplished in any usual manner, as by interchanging two of the three phases of the applied voltage.

Although I have so far described the secondary winding as a squirrel-cage winding, it will be readily seen by reference to Fig. 3 that the same result would be secured were the two parts of the secondary winding constructed as two form-wound windings, illustrated diagrammatically as ring windings 31 and 32, whose corresponding points are interconnected through slip rings and connecting members 33. A suitable high resistance member 34 will then be connected in shunt to these interconnecting wires 33, and it will be seen that by means of this arrangement the high resistance member 34 may be placed externally of the rotating member. It will further be seen that with this arrangement, I may use two motors of standard construction, having form-wound secondary windings, with their rotors mechanically connected to form a common driving shaft.

While I have herein described certain preferred arrangements and modes of operation, it will be understood that I do not wish to be limited to the exact arrangements and modes of operation shown and described, but seek to cover in the appended claim all those modifications and variations which come within the true scope and spirit of my invention.

What I claim as new and desire to secure by Letters Patent of the United States, is:—

The method of starting and accelerating an induction motor having two primary windings associated with a two-part secondary winding having its parts electrically interconnected, which consists in exciting said primary windings in such a manner as to induce opposite polarities in the parts of the secondary winding, gradually weakening the voltage applied to one of said primary windings and then building it up in the opposite direction.

In witness whereof, I have hereunto set my hand this 20th day of March 1916.

HENRY M. HOBART.